April 22, 1969  R. F. C. BRACHET  3,439,533
UNBONDED RESISTANCE WIRE STRAIN GAGE
Filed Nov. 9, 1966  Sheet 1 of 6

INVENTOR:
Roland F. C. BRACHET
BY
ATTORNEY

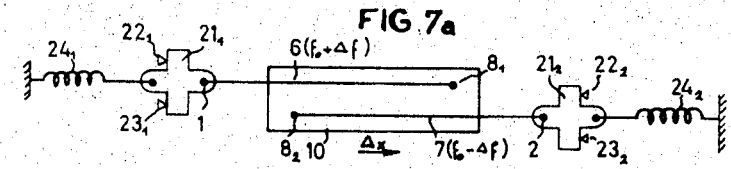
FIG. 7a
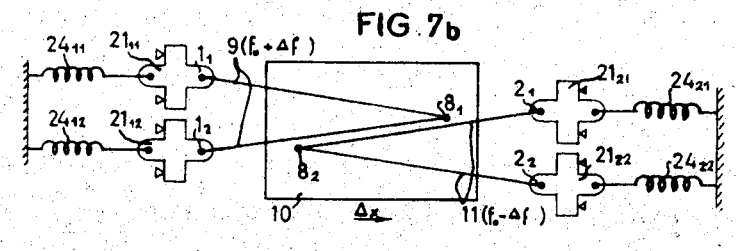
FIG. 7b
FIG 5
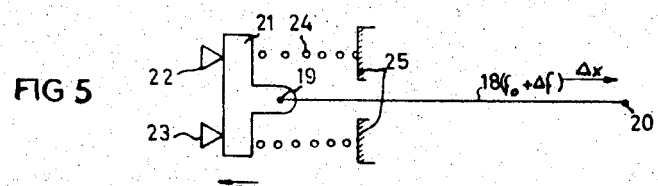
FIG. 6
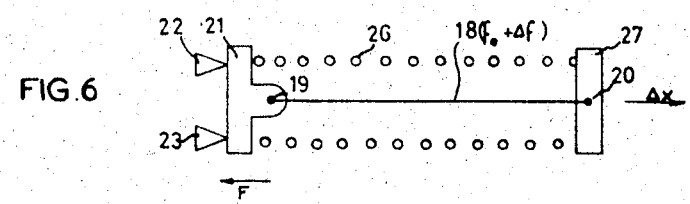

April 22, 1969  R. F. C. BRACHET  3,439,533
UNBONDED RESISTANCE WIRE STRAIN GAGE
Filed Nov. 9, 1966  Sheet 4 of 6

INVENTOR:
Roland F. C. BRACHET
BY
ATTORNEY

INVENTOR:
Roland F. C. BRACHET
BY
ATTORNEY

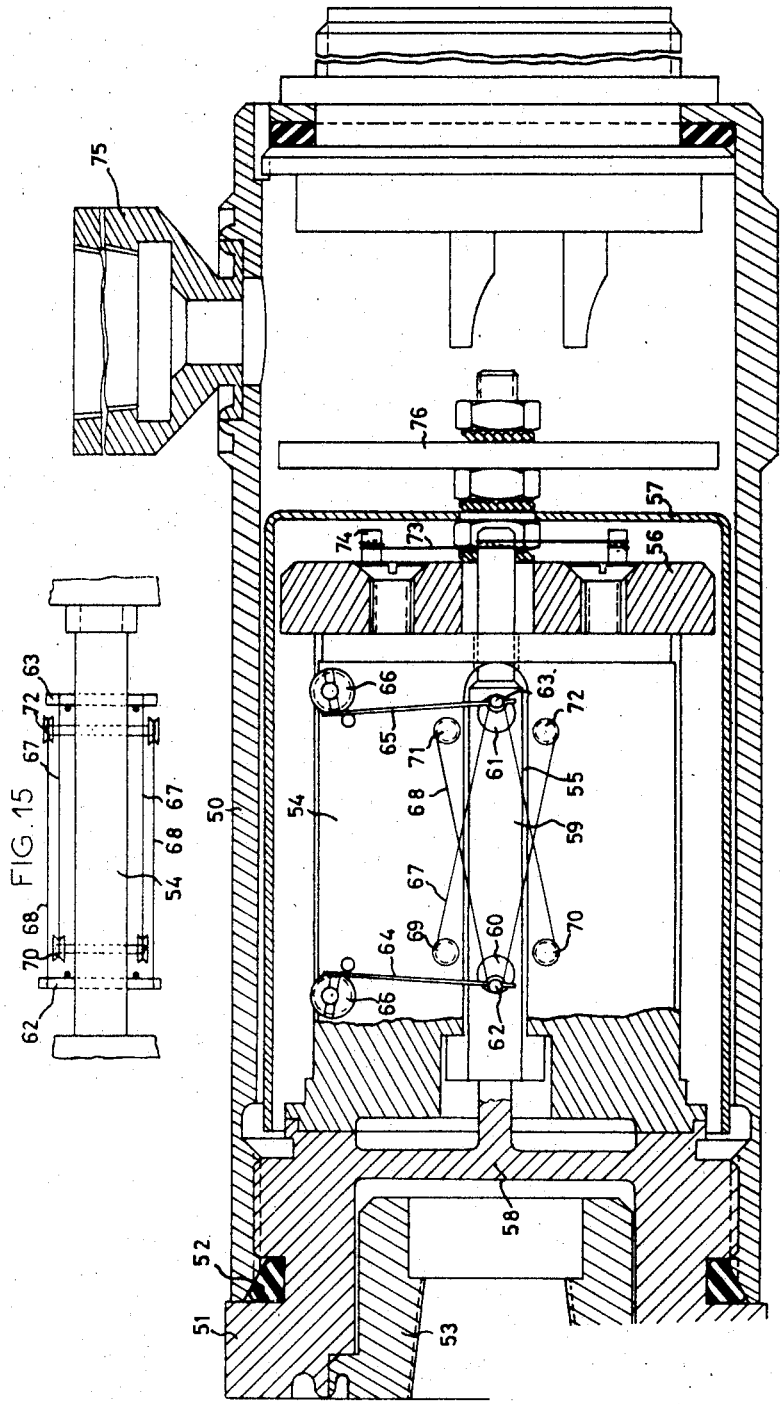

United States Patent Office 3,439,533
Patented Apr. 22, 1969

3,439,533
UNBONDED RESISTANCE WIRE STRAIN GAGE
Roland F. C. Brachet, Bagneux, France, assignor to Societe Metrel, Le Chesnay, France, a body corporation of France
Filed Nov. 9, 1966, Ser. No. 593,092
Claims priority, application France, Nov. 10, 1965, 37,875
Int. Cl. G01n 3/28
U.S. Cl. 73—88.5          1 Claim

ABSTRACT OF THE DISCLOSURE

An unbonded resistance wire strain gage with overload protection comprising a frame, two wire tensioning members connected by springs to the frame, a mobile member, the taut wire being held in position between the wire tensioning and mobile members and being subjected to strain applied to the mobile member attached to the wire, the strain being applied along a direction parallel to the axis of the wire whereby the wire is either lengthened or shortened between limits of tension until a predetermined extension of the wire is reached, stop means which limits the movement of the wire tensioning members, said predetermined tension in the wire being balanced by the force of spring means which balances said taut wire whereby the taut wire measures large extensions without overstressing the wire, and said spring means including a spring member which provides a lower rate of increase of tension of the taut wire before the tensioning member comes into contact with the stop means.

---

The present invention relates to improvements in unbonded resistance wire strain gages and aims to modify, beyond the measurement range, the law governing the wire stress variation as a function of displacement, either by decreasing the slope, or by making it nil.

Unbonded resistance wire strain gages are well known in the prior art. In their simplest form, they comprise a thin metal wire stretched under a given initial stress between two points to which it is fastened, means for varying the distance between the two fastening points under the effect of stress, means for causing a flow of current through the wire and means for measuring the variations in the resistance of the wire, which is proportional within certain limits, to the strain applied thereto and consequently to its length.

In point of fact, unbonded resistance wire strain gages comprise several component strands so as to render errors negligible, on account of symmetry, which might be caused by variations in the resistance of the active wire due to causes other than measurement, for example, to the effect of temperature, to alteration of the initial stress of the wire due to creep, etc.

Thus, unbonded resistance wire strain gage systems corresponding to the following diagrams are known in the previous art. In the simplest type of assembly, a single rectilinear strand is stretched between two fixed points, and the mobile unit, to which the stress is applied, is fastened to an intermediate point on the strand so that part of the strand is subjected to the sum of the initial stress $f_0$ and the stress $\Delta f$ to be measured and the other part of the strand to the difference between the initial stress $f_0$ and the stress $\Delta f$ to be measured. The gage may also comprise two parallel strands, one fastened between a first fixed point and a first point on a mobile unit, and the other fastened between a second fixed point and a second point on this mobile unit, the mobile unit being guided in a direction which is parallel to the strands. The gage may also comprise two strands shaped in the form of a hairpin, the first one being tied to two fixed points and to a point on a mobile unit, and the second one to two other fixed points and to another point on this mobile unit, the arrangement being such that the direction of displacement of the mobile unit and the bisecting lines of the hairpins are parallel, the bisecting lines of the hairpins, however, being distinct. The gage may also comprise two strands shaped in the form of a hairpin, as in the preceding case, but in which the bisecting lines extend coaxially. The tight wire unbonded resistance wire strain gage may also comprise four parallel strands two of which are fastened to a mobile unit and to two fixed points on one side of this unit and two fastened to said mobile unit and to two fixed points on the other side of the unit, this unit being guided so as to move under the effect of the stress to be measured in a parallel direction to the strands. Finally, in another known arrangement, a blade having an extremity embedded into a fixed support and having a free extremity, subjected to a strength perpendicular to its length, is equipped at its free extremity with means for the fixation of two wires, that are parallel to the blade and symmetrical with respect to the latter and whose other extremities are fixed to said fixed support. In all systems comprising strand pairs, one (or some of them) is subjected to the initial stress plus the measurement stress (these strands are denoted by the inscription $f_0+\Delta f$ in the figures) and the other one (or the other ones) is subjected to the initial stress less the measurement stress (these strands are denoted by the inscription $f_0-\Delta f$ in the figures).

All of the unbonded resistance wire strain gages built according to the foregoing known constructions possess a good or excellent precision, but suffer from a common drawback, namely a fragility with respect to overload.

The object of the invention is to decrease and even to cancel the stress variation which the wires in unbonded resistance wire strain gages undergo beyond a limiting stress to effectively provide overload protection or, alternatively, a dual measurement range.

According to the invention, one of the points of attachment of the tight wire in the gage is located on an intermediate part linked to the fixed part which is held in position by holding means until a predetermined extension is reached and then the tension in the wire overcomes the force of a spring biasing the fixed wire while stop means are provided to limit the movement of the holding means which tensions the wire and thereby limit the course of the movement of the wire to permit it to measure large extensions without overstressing it.

As it is desired to decrease the slope of the "stress versus elongation" characteristic beyond a certain stress limit, the intermediate part, to which is attached one of the extremities of the wire, is fixed onto a spring which presses it onto a fixed or mobile stop and the other extremity of the spring is fixed to an anchoring point being both located either on the fixed part or on the moon the fixed or mobile part of the gage, the stop and anchoring point being both located either on the fixed part or on the mobile part of the gage.

As it is desired to cancel the variation of the stress versus the elongation of the wire beyond a given stress limit, the intermediate part to which is attached one the extremities of the wire, is fixed onto a spring which presses it onto a fixed or mobile stop and the other extremity of the spring is fixed to an anchoring point on the mobile or fixed part, the stop and anchoring point being located, one on the fixed part, and the other on the mobile part of the gage.

The device of the invention which comprises the intermediate part, its stop and its spring will subsequently be designated by the term "disengageable stop."

The invention will now be described in detail with reference to the accompanying drawings in which:

FIGS. 4, 5 and 6 show unbonded resistance wire strain gages according to the invention in which the wire comprises only one strand;

FIGS. 7a to 7e show respectively unbonded resistance wire strain gages of the type shown in FIGS. 2a to 2e equipped with a disengagable stop;

FIGS. 8 to 15 show more complex types of tight wire pickups with disengagable stops.

In the figures, the displacement of the mobile part of the wire strain gage is indicated by $\Delta x$.

FIGS. 1 and 2a to 2e are recapitulations of the prior art. In all these figures, the mobile unit subjected to stress is designated by 10 and it is guided by means not in a parallel direction with the strands when the latter are parallel and in a direction parallel to the bisecting line of the strands when the latter form an angle.

Figure 1:
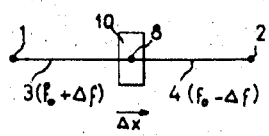
FIGS. 1 and 2a to 2e show unbonded resistance strain wire gages of the prior art.

In FIG. 1, the measuring wire comprises two strands 3 and 4 in alignment, fastened respectively to fixed points 1 and 2 and to a common point 8 of the mobile unit 10. For a displacement $\Delta x$ of the unit, as indicated by the arrow, strand 3 is subjected to a stress $f_0 + \Delta f$ and a strand 4 to a stress of $f_0 - \Delta f$.

Figure 2A:
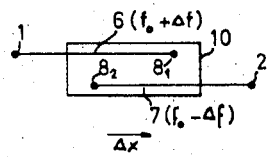

In FIG. 2a, the measuring wire comprises two separated, parallel and non-aligned strands 6 and 7 fastened respectively to fixed points 1 and 2 and to points $8_1$ and $8_2$ of the mobile unit 10.

In FIG, 2b, the measurement wire comprises two strands shaped in the form of a hairpin 9 and 11 whose bisecting lines are parallel and non-aligned, these strands being fastened respectively to fixed points $1_1$ and $1_2$ and to point $8_1$ of the mobile unit for hairpin-shaped strand 9 and to fixed points $2_1$ and $2_2$ and to point $8_2$ of the mobile unit for hairpin-shaped strand 11.

Figure 2B:
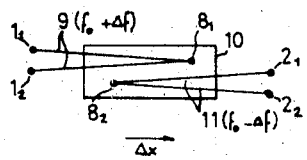
Figure 2C:
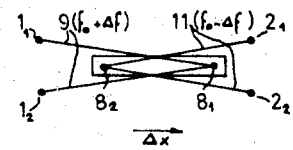

In FIG. 2c, the components of the gage are designated by the same reference numerals as in FIG. 2b, but the bisecting lines of the hairpins are parallel and aligned.

Figure 2D:
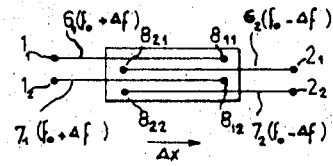

FIG. 2d represents a four strand pickup which is deducted through duplication from that of FIG. 2a. $1_1$, $1_2$, $2_1$ and $2_2$ are the fixed fastening points, $6_1$, $6_2$, $7_1$ and $7_2$, are the strands, and $8_{11}$, $8_{12}$, $8_{21}$ and $8_{22}$ are the fastening points on the mobile unit 10.

Figure 2E:
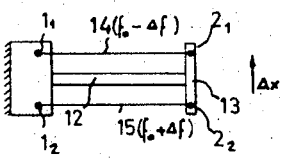

FIG. 2e, finally, represents a blade 12 which is embedded on one side and is free on the other side, and supports a cross-member 13 on the free side. Parallel wires 14 and 15 are fastened, on one side, to the fixed support and on the other side to cross-member 13 and the stress to be measured is applied to the blade in a direction perpendicular to its length.

Figure 3:
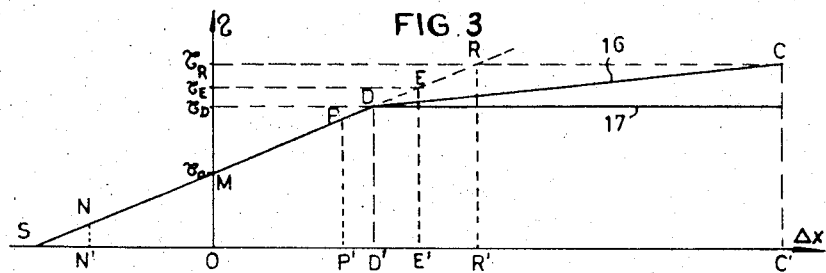
FIG. 3 is a diagram explaining the stress and strain forces in the unbonded resistance wire strain gage of the invention.

Referring not to FIG. 3, the stress T on the wire is shown as a function of the displacement $\Delta x$ of the mobile extremity of the wire. Let $T_E$ be the stress corresponding to the elastic limit of the wire and $T_R$ the stress corresponding to its rupture. It is assumed that the initial stress on the wire is set at $T_0 = T_E/2$. The range of maximal measurement corresponds to the displacement SO towards the left and OE' towards the right. If the displacement is increased beyond OE', the point R' is approached which corresponds to rupture of the wire. The authorized overload coefficient may thus be characterized by the quotient OR'/OE'. It is not very high if the entire displacement SE' measuring range is actually used. On the other hand, the means which consists in using only part of the measuring range, for example by limiting the displacement to N'P' if it actually increases the overload coefficient which becomes OR'/OP', reduces, correlatively, the sensitivity of the gage while at the same time increasing the relative incidence of certain parasitic effects, i.e., decreases the precision of the pickup. It is therefore not advisable to continue in this direction, and it is a fact that very generally, the authorized overload coefficients are of the order of two.

The general idea of the invention resides in the fact that for a given stress $T_D$ corresponding to a displacement OD', the wire, which up to now was functioning according to the current art, undergoes a change in the type of functioning and operates according to a new method which, either considerably lowers the slope of the "stress-elongation" law (curve 16, FIG. 3) and then transfers the rupture to a displacement OC' which is considerably larger than OR', or else even resists any increase in the wire stress (curve 17, FIG. 3) thus causing the authorized overloads to be without any limits.

Figure 4:
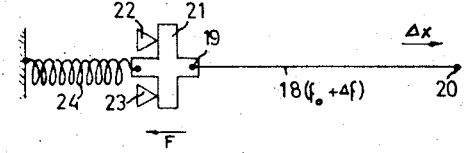

Referring now to FIGS. 4 and 5, the active wire 18 has a fixed extremity 19 and a mobile extremity 20 tied to the mobile member. The fixed extremity 19 is tied to a mobile part 21 which during measurement (zone OD', FIG. 3) is pressed onto stops 22 and 23 through the effect of a spring 24 extended as in FIG. 4 and compressed as in FIG. 5, which applies a force F on part 21, in a direction opposite to that applied to the wire $(f_0 + \Delta f)$, $\Delta f$ being precisely created by the displacement $\Delta x$ of the wire's extremity 20.

It can be seen, that as long as $F > f_0 + \Delta f$, the gage functions in the same way as a conventional gage, without any interference whatsoever from spring 24 as far as measurement is concerned, the latter being limited to the meterological definition of the position of point 19. The force exerted by member 21 on stops 22 and 23 being $F - (f_0 + \Delta f)$, it can be seen that this conventional mode of operation when displacement $\Delta x$ increases progressively is maintained until $(f_0 + \Delta f)$, which increases correlatively, reaches the value F. At this moment, mobile member 21 stops pressing against stops 22 and 23 and is "carried along" by the wire, whose stress is then determined by the force-displacement law of spring 24. This second mode of operation corresponds to section DC of straight line 16 in the diagram shown in FIG. 3. It may be readily understood that, using a spring having a low stiffness coefficient, a dangerous stress will be reached for the measuring wire only for displacements which are considerably larger than that relative to the measuring range.

In FIG. 6, spring 26, instead of being attached, a spring 24 in FIG. 5 between member 21 and fixed blocks 25, is fixed between member 21 and a member 27 which is not stationary any more but integral with moving point 20. In this arrangement, it can be seen that member 21 supports a force $F - (f_0 + \Delta f)$ but that its displacement, which is the basis of the measurement, imposes the expected metrological law to active wire 18, which is independent of spring 26 as long as $F > f_0 + \Delta f$. When, as $\Delta x$ increases, the equilibrium $f_0 + \Delta f = F$, is reached, part 27 carries mobile part 21 along with it and the relative position of components 18, 21, 26, 27 remains the same throughout the overload. this means that the measuring wire retains a constant stress, as it follows the low represented by straight line 17 in FIG. 3.

FIGS. 7a to 7e show respectively how the gages represented in FIGS. 2a to 2e may be transformed according to the arrangement of FIG. 4 which illustrates the basic concept of the present invention. On each of FIGS. 7a to 7e, the resistance wire, the mobile unit and the connections have the same reference numerals respectively as these same components in FIGS. 2a to 2e but each fixed connection is placed upon a mobile part such as 21 in FIG. 4 and provided with a spring such as 24 and with two bearing stops such as 22 and 23.

When the wire on a same side of the mobile unit receives an applied stress which is to be measured, consists of two strands, (case of FIGS. 7b–7e), each of the extremities of both strands, $1_1$ and $1_2$ or $2_1$ and $2_2$, is fixed onto a particular mobile part $21_{11}$ and $21_{12}$ or $21_{21}$ and $22_{22}$, and each of these mobile parts is provided with its own spring $24_{11}$ and $24_{12}$ or $24_{21}$ and $24_{22}$ and with its own stops.

Figure 7C:
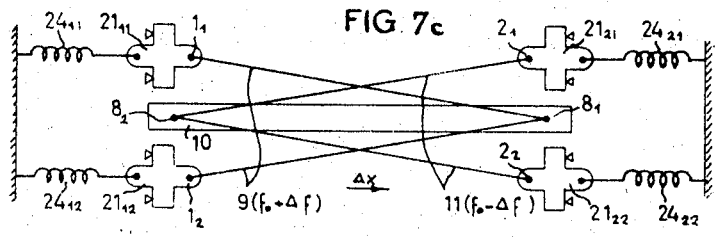
Figure 7D:
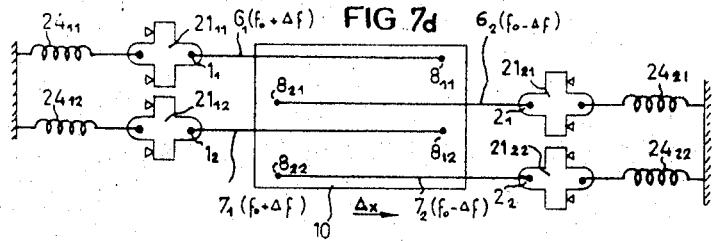
Figure 7E:
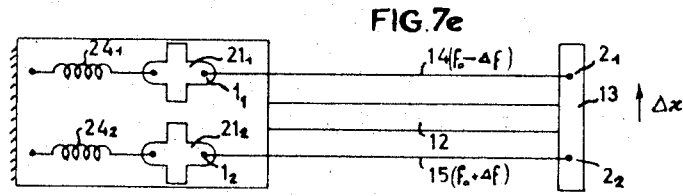
Figure 8:
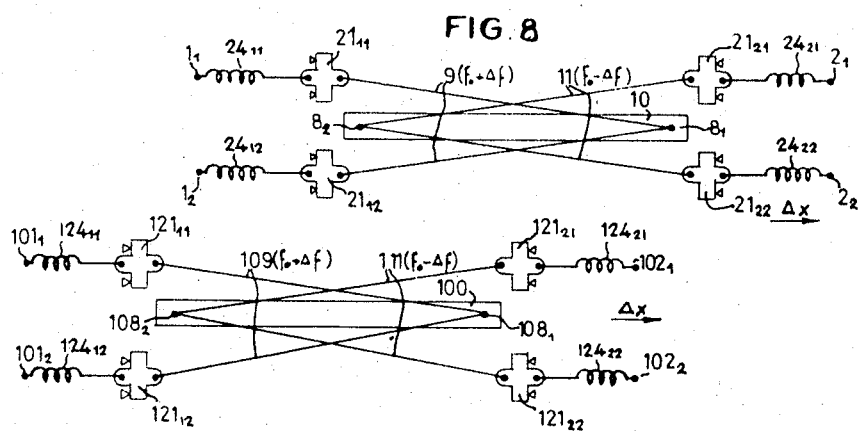

FIG. 8 shows a gage of the present invention comprising two assemblies of the type shown in FIG. 7c. The reference numbers of one of the assemblies is higher by 100 to those of the other assembly. Units 10 and 100 are in mechanically integral connection and it is their displacement which is the basis for measurement.

Figure 9:
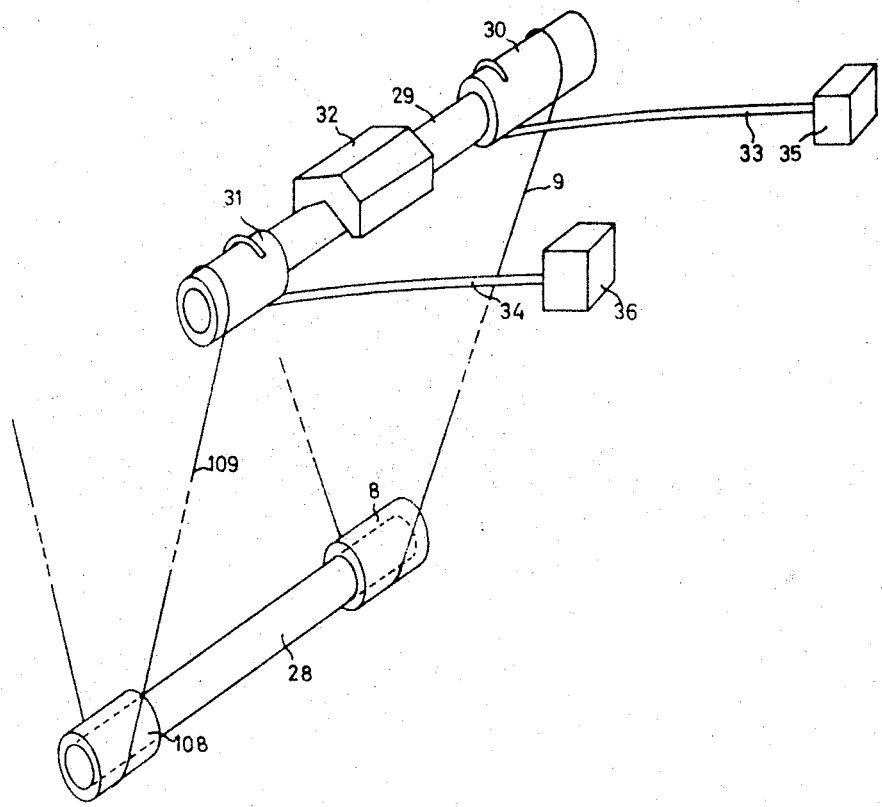

FIG. 9 shows in a detailed fashion the practical realization of one of the mobile units and of one of the disengageable stops.

Drive points 8 and 108 are two crimped metal jackets on the end parts of a shaft 28 which is a non-conductor of electricity (whose displacement is to be measured). A second non-conducting shaft 29, which is jacketed as well at 30 and 31 at its extremities, is applied to a trough 32 by the two leaf flexion springs 33 and 34 originating at the fixed binding posts 35 to 36 and welded onto jackets 30 and 31. Shaft 29 and its jackets constitute the assembly of mobile parts $21_{11}$ and $121_{11}$ of FIG. 8. Measurement wires 9 and 109 originate at jackets 30 and 31, go through jackets 8 and 108 and then go to jackets homologous to 30 and 31 (not shown) which make up the assembly of mobile parts $21_{12}$ and $121_{12}$. In this example, parts 32, 35 and 36 are integral with the fixed part of the gage, axis 28 is integral with the mobile part of the gage and part 29 constitutes the disengageable stop according to the invention. The entire unit of such a gage consists of four components of type 29 (i.e. referring to FIG. 8, these are the mobile part couples $21_{11}$–$121_{11}$, $21_{12}$–$121_{12}$, $21_{21}$–$121_{21}$ and $21_{22}$–$121_{22}$) and two components of type 28. As can be clearly seen in FIG. 9, such an arrangement insures in a very satisfactory manner, through the flexion blades welded onto the jackets, the repositioning of the disengageable stop after disengagement and insures an excellent behaviour with respect to accelerations, the mobile mass being very small.

Figure 10:
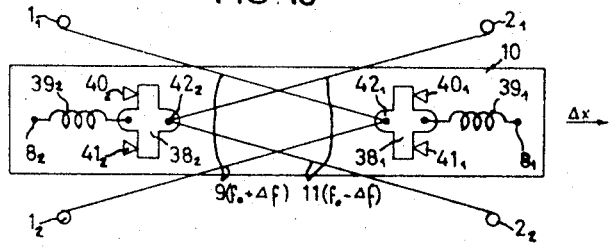
Figure 11:
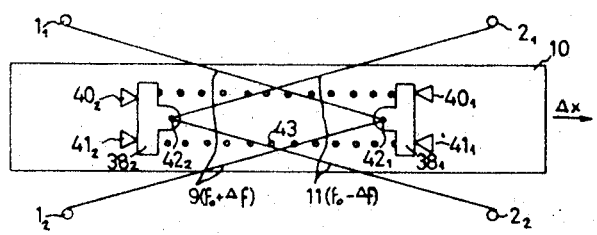
Figure 12:
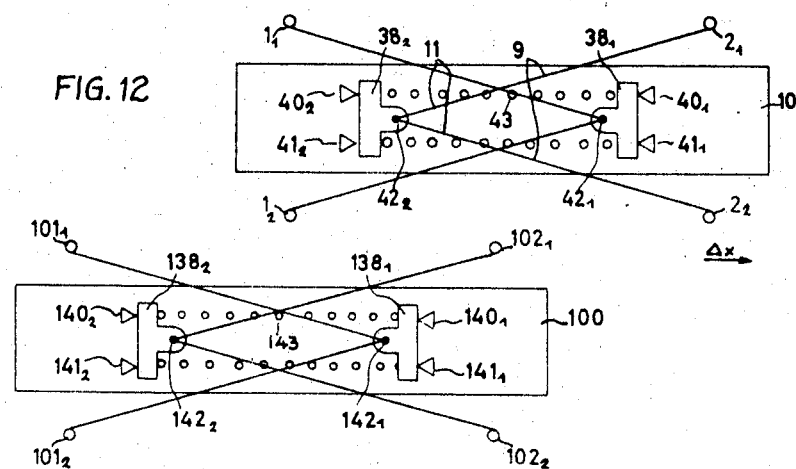

In the preceding examples, the disengageable stops are placed between the fixed extremeties of the wires and the fixed part of the gage. In FIGS. 10, 11 and 12, the disengageable stops are placed between the extremities of the wires tied to the mobile part of the gage and this mobile part.

In FIG. 10, wires 9 and 11 are linked to fixed points $1_1$–$1_2$ and $2_1$–$2_2$ and to mobile points $42_1$ and $42_2$ respectively located on mobile parts $38_1$ and $38_2$. These mobile parts are linked to mobile unit 10 through disengageable stops formed by springs $39_1$ and $39_2$ tied to points $8_1$ and $8_2$ and by fixed stops $40_1$–$41_1$ and $40_2$–$41_2$.

The gage of FIG. 11 differs from the pickup of FIG. 10 only in that both extension springs $39_1$ and $39_2$ are replaced by a single compression spring 43.

FIG. 12 shows a two branch gage, each consisting of a gage of the type of FIG. 11.

It should be noted that if the connections of springs $8_1$ and $8_2$ in the gage shown in FIG. 10 were belonging to the fixed part and not to the mobile part, the latter consisting only of stops $40_1$–$41_1$ and $40_2$–$41_2$, the operation should take place according to the horizontal straight line 17 of FIG. 3 and no longer according to the inclined straight line 16.

Figure 13:
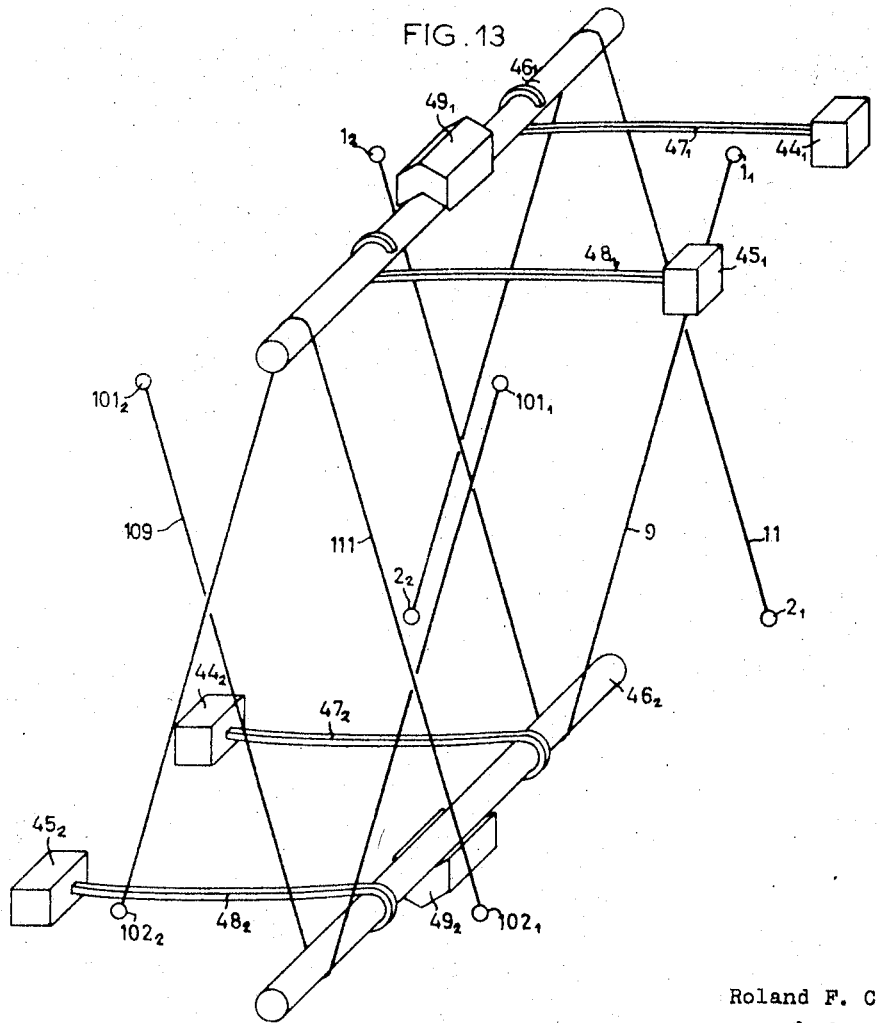

FIG. 13 shows a two branch gage of the type shown in FIG. 6, i.e. whose "stress-elongation" characteristic is of the type represented by curve 17 in FIG. 3. Although FIG. 6 has been explained by assuming that part 27 is the mobile part of the gage and that stops 22 and 23 form its fixed part, it is of course possible to invert the role of the mobile and fixed parts.

In FIG. 13, the fixed part consists of connections $1_1$–$1_2$, $101_1$–$101_2$, $2_1$–$2_2$ and $101_1$–$102_2$ for wires 9–109 and 11–111, the first two of which are coiled around insulating bar $46_2$ and the two second ones around insulating bar $46_1$. Insulating bar $46_1$ is supported with respect to the fixed part of the gage by two leaf springs $47_1$ and $48_1$ functioning through flexion and anchored to this fixed part through footings $44_1$ and $45_1$. Similarly, insulating bar $46_2$ is supported with respect of the fixed part of the gage by two bending leaf blades $47_2$ and $48_2$ functioning through flexion and anchored to the fixed part through footings $44_2$ and $45_2$. The only mobile components are the two troughs $49_1$ and $49_2$ to which are applied the bars under the influence of the leaf springs.

It can be seen, in comparison with FIG. 6, that springs $47_1$–$48_1$ (and $47_2$–$48_2$) correspond to spring 26 which, pressing on the fixed part $44_1$–$45_1$ (and $44_2$–$45_2$) corresponding to the fixed part 27, press the fixed parts $46_1$ (and $46_2$), corresponding to part 21, against the mobile stops $49_1$ (and $49_2$), corresponding to stops 22 and 23. In other words, as long as the stress remains below the force of the spring, $46_1$ and $46_2$ are members of the mobile part; when the stress becomes superior to the force of the spring, $46_1$ and $46_2$ are members of the fixed part and the measured stress remains constant and equal to the force of the spring.

FIGS. 14 and 15 show a pressure gage using the arrangement of FIG. 13.

The gage comprises a tubular part 50 on which is screwed a membrane-bearing collar 51 with a gasket placed therebetween. In this membrane-bearing collar is welded an adapter 53 having an interior threading and into which a conduit head may be screwed, this conduit containing for example a liquid under pressure. Inside tubular member 50 is placed a diametrical plate 54 bearing the fastening points for the springs and the wires. This diametrical plate comprises an elongated axial hole 55 over which there is secured a circular plate 56 perpendicular to the plane of plate 54 and whose center is located on the axis of tubular member 50. The assembly consisting of plate 54 and plate 56, as well as of the bar, the springs and the wires which would now be disclosed, is protected by an interior hood 57.

Membrane 58 of the pressure gage is linked to a bar 59 in which are bored two transverse holes 60 and 61 acting as mobile stops. Bar 59 is housed in hole 55 of plate 54. Holes 60 and 61 are traversed by sapphire axes 62 and 63 whose diameters are smaller than that of the holes with the axes pressing against the walls of the holes through leaf spring couples 64 and 65 embedded in spindles 66 which are secured perpendicularly to plate 54, the spring ends resting against the extremities of axes 62 and 63. Leaf springs 64 press axis 62 towards the left of hole 60 and leaf springs 65 press axis 63 towards the right of hole 61. Wires 67 and 68 are anchored onto fixed shafts denoted respectively by 69 and 70 for wire 67 and 71 and 72 for wire 68 and pass respectively around the extremities of axes 63 and 62.

Bar 59 is guided by wires 73 stretched between the extremity of the bar and several spindles 74, fixed onto the surface of circular plate 56.

The function of tip 75 is to apply, as may be required, a reference pressure within the gage interior space and 76 designates a plate whose function is to adapt the outgoing cable of the gage to connections (not shown) coming from the measuring wires.

What I claim is:

1. An unbonded resistance wire strain gage having a tensioned resistance wire adapted for measurement in a dual measurement range under forces below and above the elastic limits of the wire and overload protection for the excessive forces comprising:

a frame;

two wire tensioning members connected by springs to said frame;

a mobile member, the taut wire being held in position between the wire tensioning and mobile members and being subjected to strain applied to the mobile member attached to the wire;

the strain being applied along a direction parallel to the axis of the wire whereby the wire is either lengthened or shortened between limits of tension until a predetermined extension of the wire is reached; stop means which limits the movement of the wire tensioning members;

said predetermined tension in the wire being balanced by the force of spring means which balances said taut wire whereby the taut wire measures large extensions without overstressing the wire; and, said spring means including a spring member which provides a lower rate of increase of tension of the taut wire before the tensioning member comes into contact with the stop means.

References Cited

UNITED STATES PATENTS

| | | |
|---|---|---|
| 2,900,613 | 8/1959 | Dahl _____ 73—88.5 X |
| 3,058,348 | 10/1962 | Statham |
| 3,324,435 | 6/1967 | Van Leeuwen |

RICHARD C. QUEISSER, *Primary Examiner.*

CHARLES E. PHILLIPS, *Assistant Examiner.*

U.S. Cl. X.R.

73—88, 95